(12) United States Patent
Blacklock

(10) Patent No.: US 7,046,236 B2
(45) Date of Patent: May 16, 2006

(54) STYLUS FOR PORTABLE COMPUTING AND PROCESSING SYSTEMS

(75) Inventor: Brian D. Blacklock, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/443,666

(22) Filed: May 22, 2003

(65) Prior Publication Data

US 2004/0233177 A1    Nov. 25, 2004

(51) Int. Cl.
*G09G 5/00*    (2006.01)
*A46B 5/02*    (2006.01)
(52) U.S. Cl. .......................................... 345/179; 401/6
(58) Field of Classification Search .................. 401/6; 345/179–183
See application file for complete search history.

(56) References Cited

U.S. PATENT DOCUMENTS

| | | | | |
|---|---|---|---|---|
| 4,035,089 A | * | 7/1977 | Schwartz et al. | 401/6 |
| 4,738,556 A | * | 4/1988 | Brown | 401/7 |
| 5,850,059 A | * | 12/1998 | Yoshimura | 178/19.01 |
| 6,146,038 A | * | 11/2000 | Mittersinker et al. | 401/6 |
| 6,249,277 B1 | * | 6/2001 | Varveris | 345/179 |
| 6,341,911 B1 | * | 1/2002 | Shueh | 401/6 |
| 6,626,598 B1 | * | 9/2003 | Schneider | 401/8 |
| D486,182 S | * | 2/2004 | Sener et al. | D19/55 |
| 6,819,557 B1 | * | 11/2004 | Lilenfeld | 361/686 |

* cited by examiner

*Primary Examiner*—Xiao Wu
*Assistant Examiner*—M. Fatahiyar
(74) *Attorney, Agent, or Firm*—Sawyer Law Group LLP

(57) ABSTRACT

A stylus for use with a portable processing system is disclosed. The stylus comprises a pointing member that is changeable in circumference when utilized. A stylus in accordance with the present invention can be expanded or contracted in very small amounts to adjust to the size of a user's fingers and hand, as well as a user's comfort level and specific health needs, thereby making much longer periods of usage far more pleasant and productive, yet such a stylus will still fit within the small size holes in a portable processing system or the recessed area often provided for a stylus in a computerized drawing tablet.

6 Claims, 6 Drawing Sheets

STYLUS FOR PORTABLE COMPUTING AND PROCESSING SYSTEMS

FIELD OF THE INVENTION

The present invention relates generally to portable computing and processing systems and particularly to a stylus for handheld computers, personal digital assistants, drawing tablets and tablet personal computers (PC).

BACKGROUND OF THE INVENTION

The stylus utilized for portable processing systems such as a Pocket PC, Palm PC, tablet PCs, and for other computer drawing tablets needs to be very small and compact so that it will work with the form factor of such units, which are typically also compact and therefore require small, often miniaturized accessories.

FIG. 1 illustrates a typical personal digital assistant (PDA) 10 and a stylus 12. As shown, the stylus 12 fits within a hole 14 in the body of the PDA 10 when it is not being used. FIG. 2 illustrates a typical computerized drawing tablet 110 and the accompanying stylus 112 with a recessed area 114 in the drawing tablet body wherein the stylus 112 is to be placed when it is not being used. The stylus typically included with such portable processing systems and computer drawing tablets is often too small and slender to be held comfortably in the hand for a long period of time. Utilizing such a small and slender stylus can cause the hand to cramp up or result in other discomforts and medical conditions such as aggravating the pain for a person with carpal tunnel syndrome.

There have been studies that show most people use four to five times more force than they need to perform most tasks involving the hands. Using a bigger diameter stylus will help reduce the force needed to grip the stylus adequately but will take up too much space in a device. This invention is a solution to solve this dilemma.

Some people utilize such styluses for only a brief period of time, but as the hardware and software for handheld computers and tablet PCs becomes more complex, and it is possible to perform a greater diversity of more complicated functions with them, people are using such small styluses for longer and longer periods of time. Accordingly, what is needed is a system and method for a stylus which fits more comfortably in the hand and reduces health problems such as those described above, including cramping, and yet which at the same time preserves the small form factor needed to comply with the compact design/form factor of portable processing systems such as PDAs, tablet PCs and computer drawing tablets. The present invention addresses such a need.

SUMMARY OF THE INVENTION

A stylus for use with a portable processing system is disclosed. The stylus comprises a pointing member that is changeable in circumference when utilized.

A stylus in accordance with the present invention can be expanded or contracted in very small amounts to adjust to the size of a user's fingers and hand, as well as a user's comfort level and specific health needs, thereby making much longer periods of usage far more pleasant and productive, yet such a stylus will still fit within the small size holes in a portable processing system or the recessed area often provided for a stylus in a computerized drawing tablet.

DETAILED DESCRIPTION

The present invention relates to a stylus for portable processing, drawing tablets and tablet personal computers (PC). The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The stylus in accordance with the present invention is capable of being expanded or contracted in circumference according to the user's personal needs, as well as the shape and size of the user's hand and fingers. The stylus can fit either into the small hole designed for storing a stylus in a portable processing system, conforming to the small form factor typical of such systems, or, because of its expansion and retraction feature, the stylus will also fit into recessed spaces often utilized for holding styluses in computerized drawing tablets.

Figure 1:
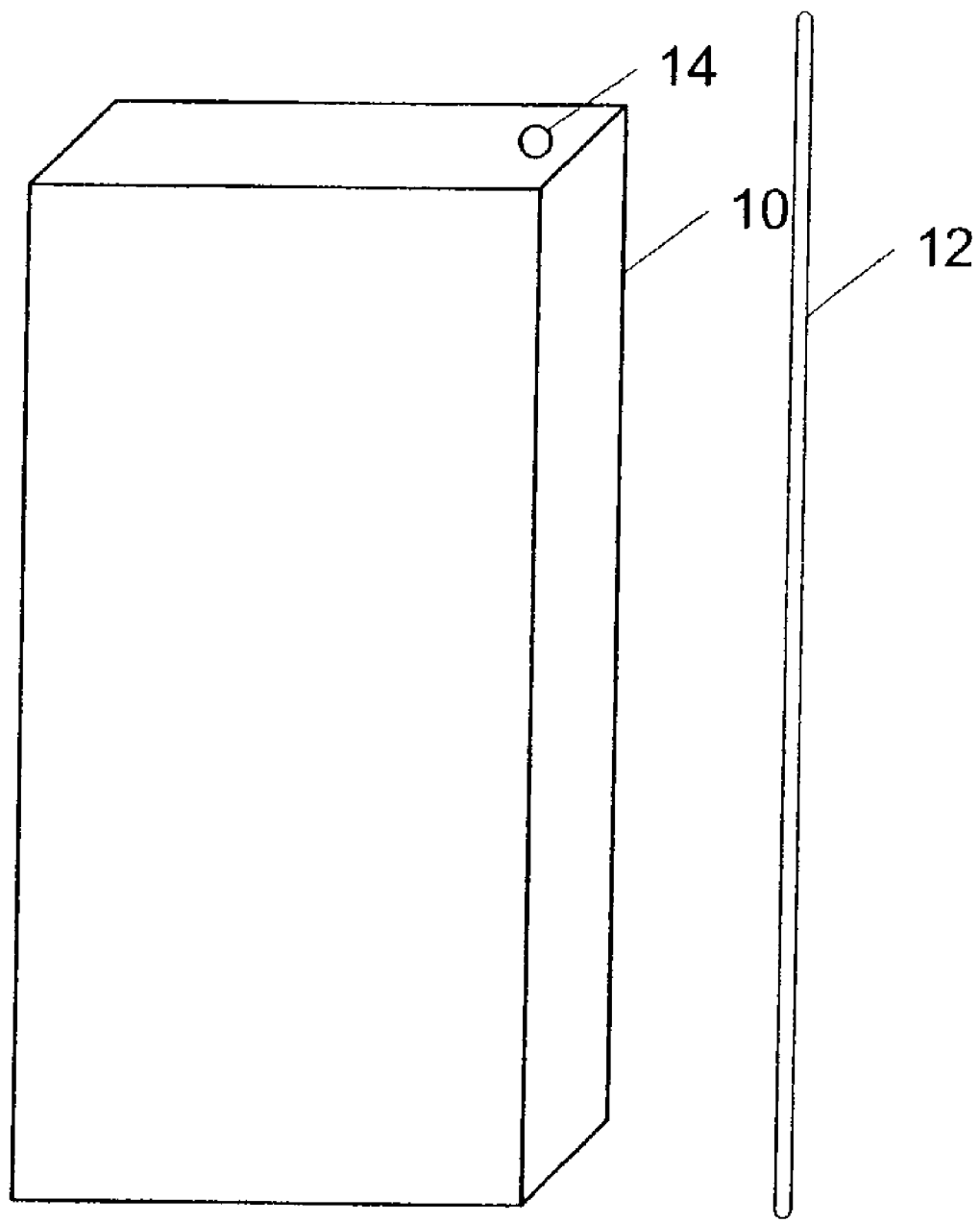
FIG. 1 illustrates a typical personal digital assistant (PDA) and miniaturized stylus with a hole in the body of the PDA where the stylus is to be inserted when it is not being used.
Figure 2:
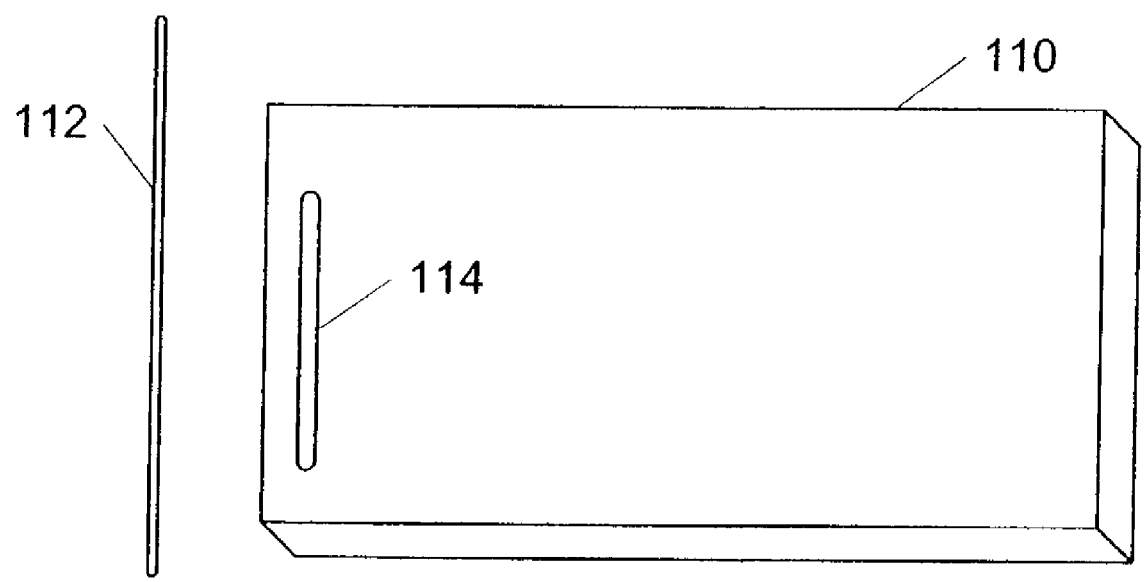
FIG. 2 illustrates a typical computerized drawing tablet and the accompanying miniaturized stylus with a recessed area in the drawing tablet body wherein the stylus is to be placed when it is not being used.
Figure 3A:
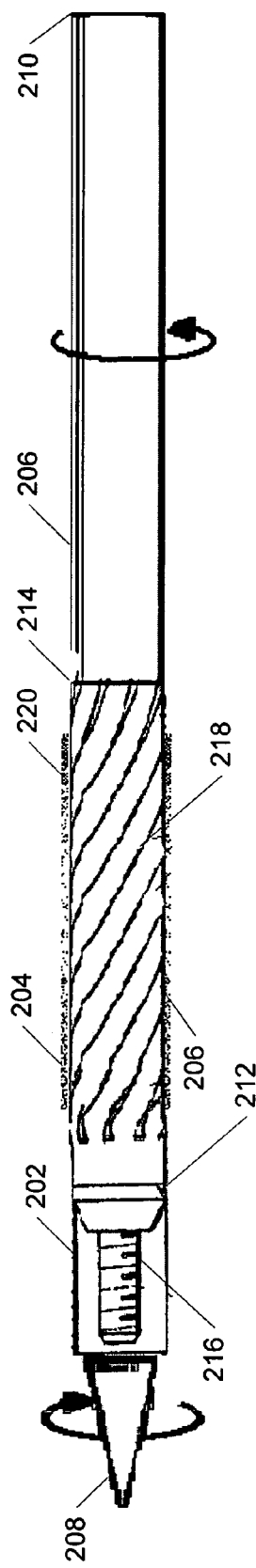
FIG. 3A illustrates a stylus in accordance with the present invention when the stylus is contracted.
Figure 3B:
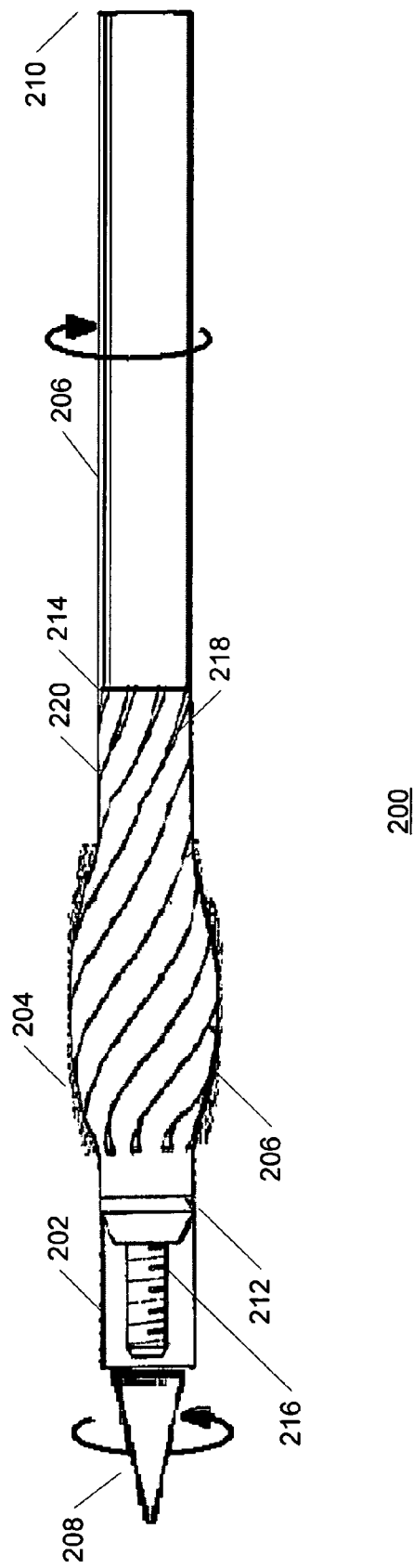
FIG. 3B illustrates the stylus in accordance with the present invention when the stylus is expanded in circumference.

FIG. 3A illustrates a stylus 200 in accordance with the present invention when the stylus 200 is contracted. FIG. 3B illustrates the stylus 200 in accordance with the present invention when the stylus 200 is expanded in circumference. The stylus or pointing member 200 comprises a pointing portion 202, a holding portion 204 and an end portion 206. One end point 208 is located at one end of the holding portion 204 and a second end point 210 is located at the opposite end of the stylus 200 at the end of the end portion 206. When a user holds on to one of the end points 208 or 210 and twists the other end point 208 or 210, the holding portion 204 of the stylus 200 expands or contracts. Two rotating joints 212 and 214 allow for the end points 208 and 210 to be twisted in either direction. A screw mechanism 216 inside the stylus 200 causes the metal strips 218 to expand or contract according to the amount of twisting, thereby allowing for the user of the stylus to adjust the expansion or contraction according both to their personal comfort level and also the size and shape of their hands and fingers. As shown in FIG. 3A, the plurality of metal strips 218 spirally surrounds the screw mechanism 216 in a first direction while the stylus 200 is in a contracted position. As shown in FIG. 3B, the plurality of metal strips 218 expand outwardly when the screw mechanism 218 is twisted in a direction opposite the first direction due to the metal strips spirally surrounding the screw mechanism in the first direction.

Although the strips 218 are described as metal strips in a first embodiment of the stylus 200 in accordance with the present invention, they could also be made from any other material which expands, and which is flexible and durable.

The rubber gripping surface 220 which surrounds the outside of the holding portion 204 of the stylus 200, thereby making the stylus 200 easier to hold securely and manipulate, is also illustrated as part of a first embodiment of the stylus 200 in accordance with the present invention. However, any other material which is comfortable to hold, and expands and contracts, could also be utilized as a gripping surface.

Although a screw mechanism 216 is illustrated as part of a first embodiment of a stylus 200 in accordance with the present invention, other means which enable the holding portion of the stylus to be expanded and contracted could also be utilized.

Figure 4:
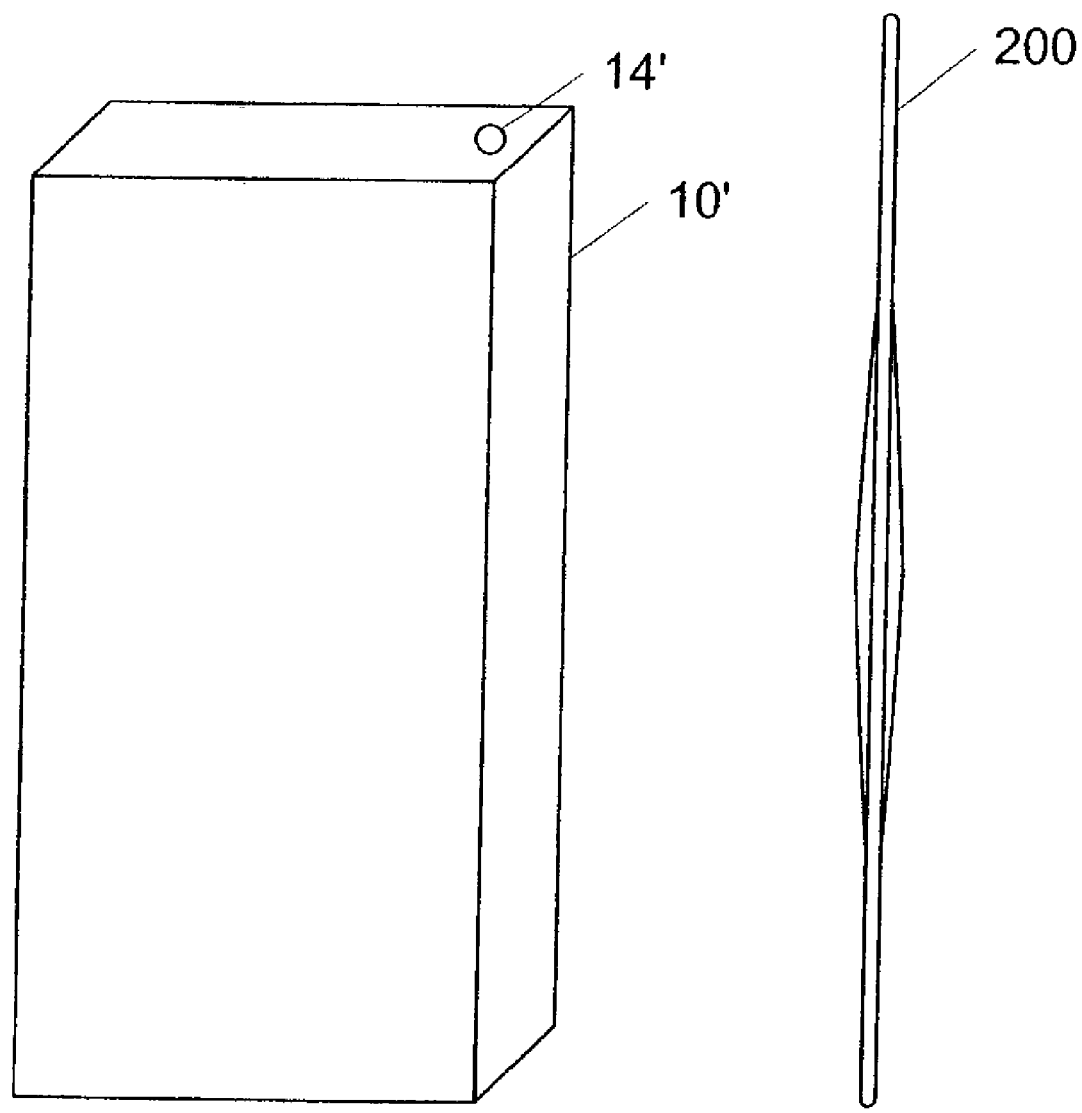
FIG. 4 illustrates a stylus in accordance with the present invention which is expanded for writing or drawing comfort and yet which also fits into the small form factor of a small hole in the body of a portable processing system.

FIG. 4 illustrates a stylus 200 in accordance with the present invention which is expanded for writing or drawing comfort and yet which also fits into the small form factor of a small hole 14' in the body of a portable processing system 10'.

Figure 5:
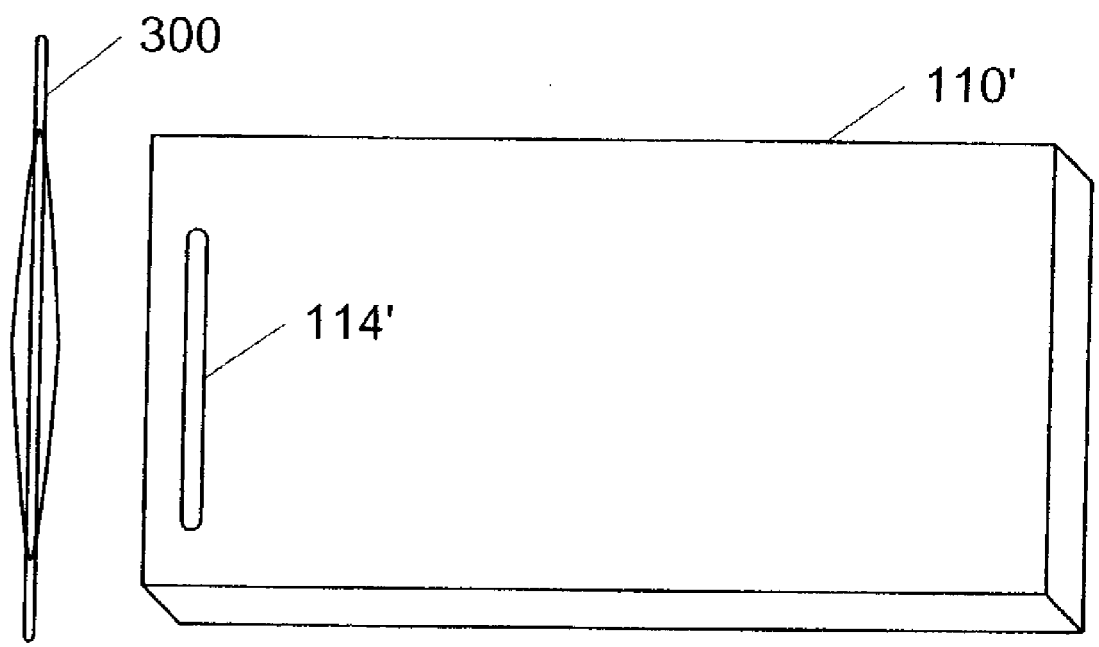
FIG. 5 illustrates a stylus in accordance with the present invention which is expanded for writing or drawing comfort and yet which also fits into the small form factor of a recessed storage space/groove in the body of a computer drawing tablet.

FIG. 5 illustrates a stylus 300 in accordance with the present invention which is expanded for writing or drawing comfort and yet which also fits into the small form factor of a recessed storage space/groove 114' in the body of a computer drawing tablet 110'.

Typically one or both ends of the stylus 200 or 300 are inserted for safekeeping into a small hole 14' in the accompanying handheld computer 10' or tablet PC as illustrated in FIG. 4 or into a recessed storage space 114' on a computer drawing tablet 110' as illustrated in FIG. 5.

Depending upon the size of the hole 14' which the manufacturer has designed for the particular portable processing system or tablet PC, the size of the ends of the stylus in accordance with the present invention could be designed and manufactured to fit that particular size of hole 14'. One advantage of the stylus in accordance with the present invention is that, because the size of original manufacturers' styluses may vary depending upon the size of the insertion hole 14' in the original manufacturer's equipment, the user of the stylus in accordance with the present invention can adjust the stylus to a wider size appropriate for his or her hand and fingers and personal comfort, yet the stylus can be stored in the smaller hole 14' in the portable processing system, PDA, or tablet PC, thereby replacing original equipment and offering much greater flexibility and convenience to the user.

A stylus in accordance with the present invention can be expanded or contracted in very small amounts to adjust to the size of a user's fingers and hand, as well as a user's comfort level and specific health needs, thereby making much longer periods of usage far more pleasant and productive, yet such a stylus will still fit within the small size holes in a portable processing system or the recessed area often provided for a stylus in a computerized drawing tablet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A stylus for use with a portable processing system, the stylus comprising:
   a pointing portion;
   an end portion; and
   a holding portion coupled between the pointing portion and the end portion, the holding portion including,
      a screw mechanism; and
      a plurality of strips spirally surrounding the screw mechanism in a first direction while the stylus is in a contracted position,
      wherein the strips expand outwardly when the screw mechanism is twisted in a direction opposite the first direction due to the strips spirally surrounding the screw mechanism in the first direction, wherein the screw mechanism is controlled by end points of the end portion and the holding portion.

2. The stylus of claim 1, wherein the plurality of strips comprise metal strips.

3. The stylus of claim 1, further comprising a gripping surface surrounding the holding portion.

4. The stylus of claim 3, wherein the gripping surface comprises a rubber gripping surface.

5. The stylus of claim 1, wherein the portable processing system comprises any of a personal digital assistant (PDA), drawing tablet, or a tablet personal computer.

6. The stylus of claim 1, wherein the stylus can be placed in an aperture of the portable processing system and can be expanded when removed therefrom.

* * * * *